United States Patent [19]
Jankowski et al.

[11] 3,784,949
[45] Jan. 8, 1974

[54] SET-POINT ASSEMBLY WITH SPIRAL RESISTOR TO REDUCE RESISTOR WEAR

[75] Inventors: Matthew A. Jankowski, Stratford; Simeon J. Donahue, Cheshire, both of Conn.

[73] Assignee: American Chain & Cable Company, Inc., New York, N.Y.

[22] Filed: May 28, 1971

[21] Appl. No.: 148,112

[52] U.S. Cl............... 338/196, 338/150, 338/89
[51] Int. Cl............................................ H01c 5/02
[58] Field of Search.................. 308/26; 324/157; 338/118, 150, 152, 160, 162, 196, 128, 135, 138, 252, 302, 75, 89, 147

[56] References Cited
UNITED STATES PATENTS

| | | | |
|---|---|---|---|
| 3,559,061 | 1/1971 | Cawthorne | 324/157 |
| 3,593,137 | 7/1971 | Wall | 324/157 |
| 3,431,033 | 3/1969 | Dangauthier | 308/26 |
| 2,476,881 | 7/1949 | Leeuwin | 338/150 |
| 2,935,740 | 5/1960 | Sperry | 338/150 |

Primary Examiner—Robert K. Schaefer
Assistant Examiner—Gerald P. Tolin
Attorney—Pennie, Edmonds, Morton, Taylor and Adams

[57] ABSTRACT

A set-point assembly for use in monitoring a process variable and generating an input reference signal to a controller unit used for controlling the process variable. The set-point assembly includes a housing drum with a scale, a set-point device rotatably mounted within the drum and having a set pointer for cooperating with the scale, a meter movement unit disposed within the drum and having an indicating pointer cooperating with the scale, and a slide wire mechanism for generating a signal corresponding to the position of the set pointer along the scale.

20 Claims, 8 Drawing Figures

PATENTED JAN 8 1974 3,784,949

INVENTORS
MATTHEW A. JANKOWSKI
SIMEON J. DONAHUE

BY Pennie, Edmonds,
Morton, Taylor & Adams
ATTORNEYS

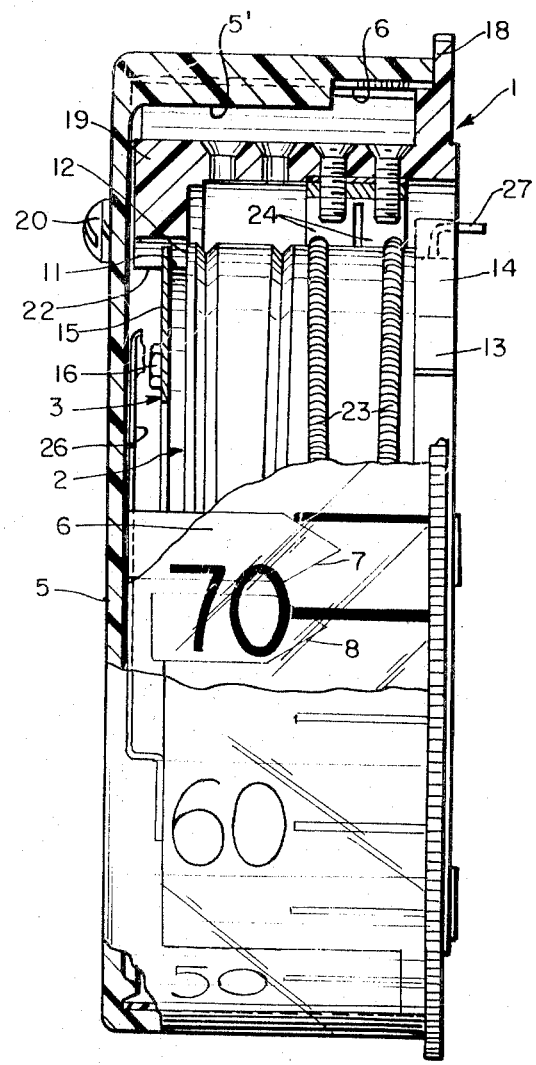

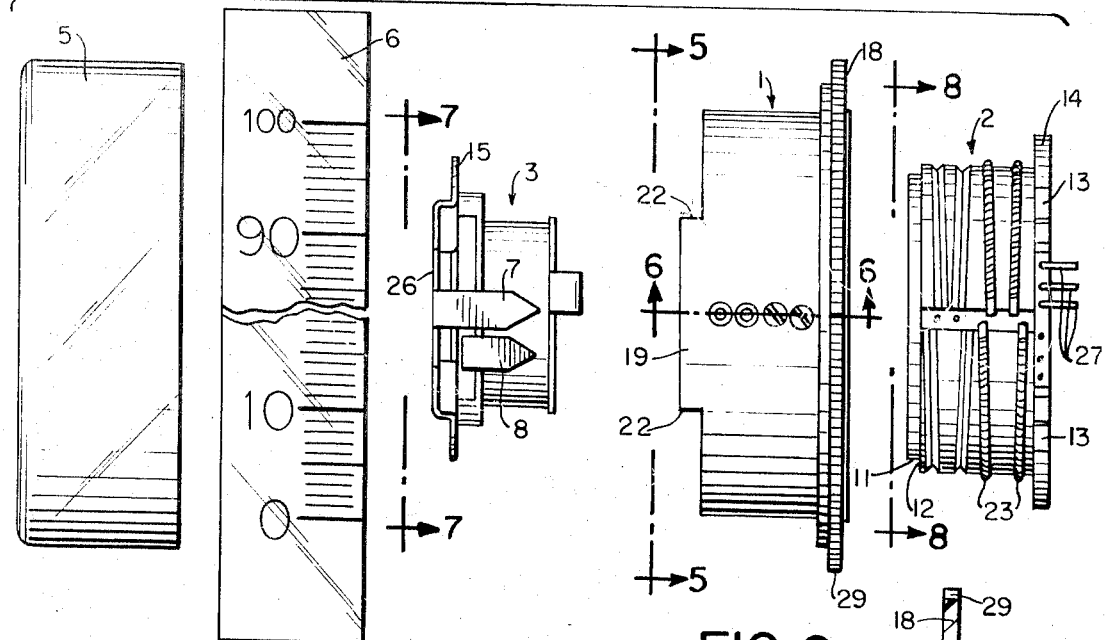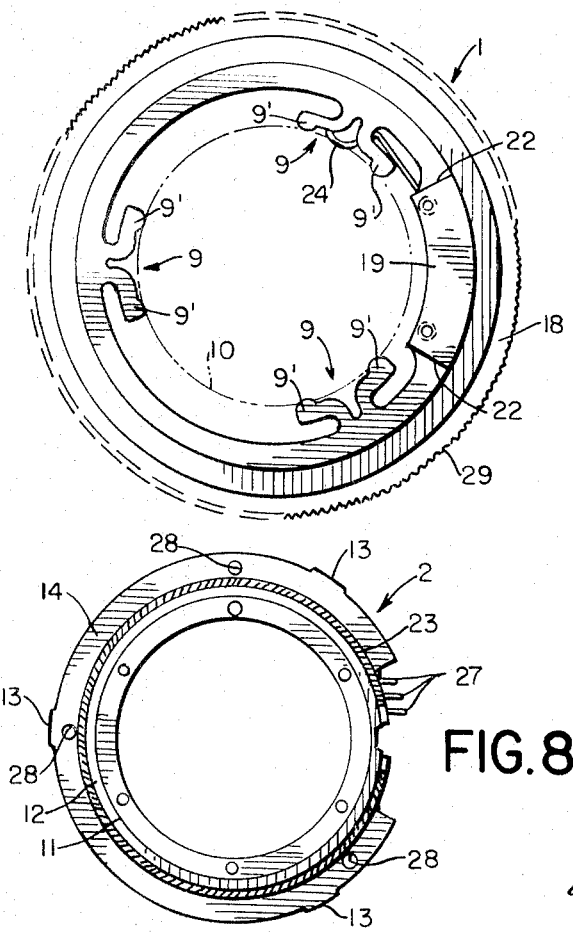

SET-POINT ASSEMBLY WITH SPIRAL RESISTOR TO REDUCE RESISTOR WEAR

BACKGROUND OF THE INVENTION

In processing operations, it is often desirable to monitor the value of one or more of the process variables. A simple example would be the monitoring of the flow of fluid through a valve. The monitoring of the flow is desired so that it can be regulated to a prescribed rate. For this purpose, a controller unit is provided.

The controller unit is constructed to measure the actual process variable, such as flow, and compare it against a set value. The difference between the actual and set values is determined and an electrical signal is generated and sent to a mechanism which is operable to adjust the process variable to the desired set value. With a valve controlling the rate of flow of fluid, the signal generated by the controller unit could be used to open and close the valve to thereby maintain the rate of flow at the set value.

As part of the overall controller unit, a set-point assembly is required to provide the controller with an input referene signal corresponding to the desired set value of the variable being controlled. Present designs of set-point assemblies are, however, quite large in size, complicated in construction and generally expensive to manufacture and maintain. Typically, presently available set-point assemblies are constructed as an integral part of a controller unit and not as a separate self-contained assembly suitable for simple connection into the controller unit.

In construction, presently available set-point assemblies include a support housing to which upstanding bearing posts are secured. A tape having a scale thereon is fitted around the upstanding posts and provided with perforations for cooperating with sprocket drive means on one or more of the posts. A cover is secured over the operative parts of the assembly and provided with an indicator dial overlying the scale to show the value at which the controller is set.

For setting the controller, a chain and sprocket or gear drive is connected to one of the upstanding posts for rotating the post to thereby move the scale across the dial. A suitable mechanism is provided for converting the movement of the tape into a corresponding electrical signal which is sent to other parts of the controller unit. A meter unit may also be mounted on the support and provided with an indicating pointer for cooperating with the scale so that a comparison between the actual value of the process variable and the set value may be made.

With prior art constructions, the complexity of the design requires both special and precision made parts. Also, with presently available assemblies, the attachment into a controller unit requires individual wiring with point-to-point connection for the electrical signals generated at different settings.

SUMMARY OF THE INVENTION

The set-point assembly of the present invention is a self-contained structure which may be easily plugged into the controller unit. Generally, the assembly includes a housing drum, a hub rotatably mounted in the drum, and a set-point mechanism fixed to the hub for rotation relative to the drum. The set-point mechanism includes a set pointer movable along the drum in overlying relation with a scale. A meter movement unit is also fixed to the hub and includes an indicating pointer cooperating with the scale on the drum.

In accordance with the teachings of the present invention, the size of the set-point assembly is significantly less than that of presently available assemblies. Also, the complexity of prior assemblies has been avoided by eliminating many of the individual parts normally found in the conventional type of assembly. The assembly of the present invention provides both a saving in cost of manufacture and a saving in maintenance costs.

BRIEF DESCRIPTION OF THE DRAWINGS

FIG. 3 is a side view, partially broken away, of the assembly shown in FIG. 1;

FIG. 4 is an exploded side view of the set-point assembly;

FIG. 5 is a cross-sectional view taken along lines 5—5 of FIG. 4;

FIG. 6 is a cross-sectional view taken along lines 6—6 of FIG. 4;

FIG. 7 is a cross-sectional view taken along lines 7—7 of FIG. 4; and

FIG. 8 is a cross-sectional view taken along lines 8—8 of FIG. 4.

DESCRIPTION OF THE PREFERRED EMBODIMENT

Figure 1:
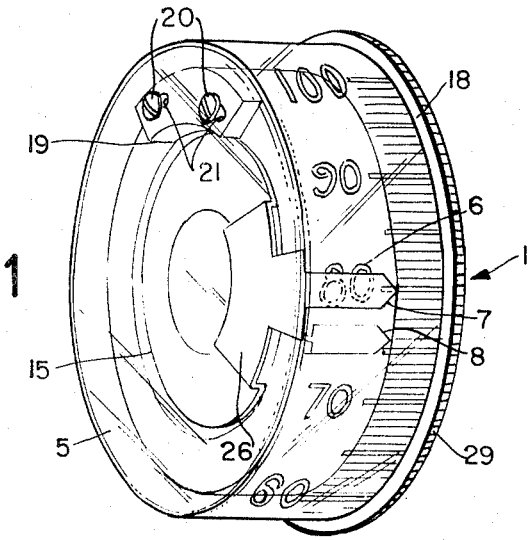
FIG. 1 is a perspective view of a set-point assembly of the present invention.

As shown in FIG. 1, the set-point assembly of the present invention is a self-contained unit of compact size. Generally, the assembly includes a housing drum 1, an inner hub 2 which is adapted to be rotatably mounted within the drum and a set-point device 3 adapted to be secured to the hub. The set-point device carries a meter movement unit 4. The drum, hub, and set-point device when assembled are enclosed by an transparent cover 5. A scale 6 is positioned inside the cover and both the set-point device and meter movement unit include pointers 7 and 8, respectively, cooperating with the scale.

The drum and hub parts of the assembly are molded from a suitable plastic material and are adapted to be assembled together from relative rotation by simply pressing the hub into the drum. For this purpose, the drum, as shown in FIG. 5, is provided with three inwardly extending drum bearing means 9 each of which is defined by a pair of arms 9'. These arms are molded as an integral part of the drum at one axial end, which will be its front end in the assembly. The arms of each pair extend radially inwardly of the drum for a short distance and are then bent in opposite directions so as to extend generally circumferentially of the drum. The arms together describe a circle 10 of predeterminded diameter. The arms are of bent shape and thin section to permit them to flex outwardly and thereby increase the diameter of the circle 10.

The hub portion of the assembly includes a bearing surface 11 of reduced diameter at one axial end thereof. This bearing surface is adapted to rotatably engage with the drum bearing means 9 when these two parts are assembled together. The diameter of the hub bearing surface 11 is slightly larger than the diameter of the circle 10 defined by the bearing means. During assembly of the hub within the drum, the arms of the bearing means flex outwardly to receive the hub; and their inherent flexibility causes them to resiliently press against the bearing surface 11 when seated thereagainst. Axial positioning of the hub within the drum is effected by a hub flange 12 defined by the reduced diameter 11 of the hub. This flange aligns itself with one side of the bearing means 9 to preclude axial movement of the hub in one direction through the drum.

The hub is further supported within the drum by bearing means 13 engaging against the inner surface of the drum at its other axial end. These bearing means 13 are defined by three raised surfaces spaced equally around the periphery of a flange 14. With this construction, the hub is, except at the flange 14, spaced radially inwardly of the drum.

The set-point means of the assembly includes a generally circular plate member 15 fixed to the front axial end of the hub. Tis plate member, which may be made of metal, is fixed to the hub by screws 16 and has a diameter slightly larger than the diameter of the reduced bearing surface 11 of the hub. The attachment of the plate to the hub thus covers the drum bearing means 9 on the side opposite the hub flange 12. The drum bearing means is, therefore, locked against axial movement in one direction by the flange 12 of the hub and in the other direction by the aligned portion of the plate 15. The hub and drum are, therefore, securely locked together against relative axial movement.

The plate member 15 of the set-point means includes an arm 17 which extends radially over the front axial end of both the hub and drum. The other end of the arm 17 is bent into the pointer 7 to overlie the outer surface of the drum. The scale 6 with which the set pointer cooperates is held within the cover 5 of the assembly. In construction, the scale is comprised of a flexible transparent strip of plastic with the indicia of the scale affixed thereon. To hold the tape within the cover, the inner surface of the cover includes an inwardly extending T-shaped protrusion 5'. The length of the tape is made equal to the circumference of the cover. Upon assembly to the cover, it is bent into a circle and the ends inserted under the crossbar of the T. In this way, the tape is held within the cover and fixed against relative rotation.

With the construction of the scale and the assembly procedure as described above, replacement may be readily made after the cover is removed from the assembly. This is advantageous in that the same set-point assembly may be used in different controller systems with different process variables by simply changing the scale.

The cover of the assembly is secured to the drum and encloses all operative parts to protect them from damage. As shown in FIG. 3, the drum includes a radially extending flange 18 at its back end. The cover 5 rests on this flange and extends over the front end of the drum. To secure the cover to the drum, the front end of the drum is provided with a raised surface 19. This surface extends above the plate and arm portions 15 and 17 of the set-point unit and is adapted to immediately underlie the front face of the cover 5. The cover 5 is fixed to the drum by screws 20 or other suitable means extending through slots 21 in the front face of the cover and into the raised surface 19. The front face of the cover is thus disposed above the set-point unit to permit its rotation relative to the drum.

The raised surface 19, in addition to providing for attachment of the cover, defines two raised stops 22. These raised stops are disposed in rotational alignment with the arm 17 of the set-point unit and thereby preclude continued rotation of the set-point unit in one direction for more than 360°. The location of the stops 22 and the position of the scale within the cover are correlated so that the set pointer 7 traverses the full length of the scale.

The set-point unit of the assembly is adapted to be electrically connected into a suitable controller unit for feeding the controller unit with an input reference signal, as for example a voltage, corresponding to the value to which the set-point assembly is set. For this purpose, a slide wire mechanism is provided. More particularly, the hub is provided on its outer surface with one or more slide wires 23. These slide wires extend circumferentially around the hub and are positioned in opposed alignment with suitable contact means 24 attached to the inner surface of the hub. Relative rotation of the drum with respect to the hub will cause the contacts 24 to move along the slide wires.

In order to reduce wear of the contacts 24 due to their continued engagement with the cooperating slide wires, the slide wires extend circumferentially around the hub in a path disposed at varying axial locations. In the embodiment shown in the drawings, each of the slide wires extends spirally around the hub for one revolution. Accordingly, as the contacts move along the length of the slide wires, the point of engagement with the contacts shifts back and forth laterally across the contacts. This not only reduces wear of the contacts but provides for even wear as it does occur.

In assembling the set-point unit to the hub, attachment is made with the ends of the slide wires oriented relative to the arm 17 of the set-point unit so that rotation of the arm from one stop 22 to the other will move the contacts 24 from one end of the slide wires to the other. In other words, when the arm of the set-point unit engages either stop 22, the contacts 24 will be disposed at one or the other end of the slide wires. Subsequent rotation of the arm away from the stop will cause the contacts to move along the slide wires toward the other end. A full range of movement is thus provided without the contacts moving off the ends of the slide wires.

The assembly as described above functions to generate the controller input reference signal necessary for operating the controller unit. As an adjunct to providing this control, the actual value of the variable must be measured and compared with the set value. This is done electrically by the controller unit. However, in order to provide a visual indication of the actual value of the process variable and the variance between it and the set value, the assembly of the present invention is provided with a meter movement unit.

Figure 2:
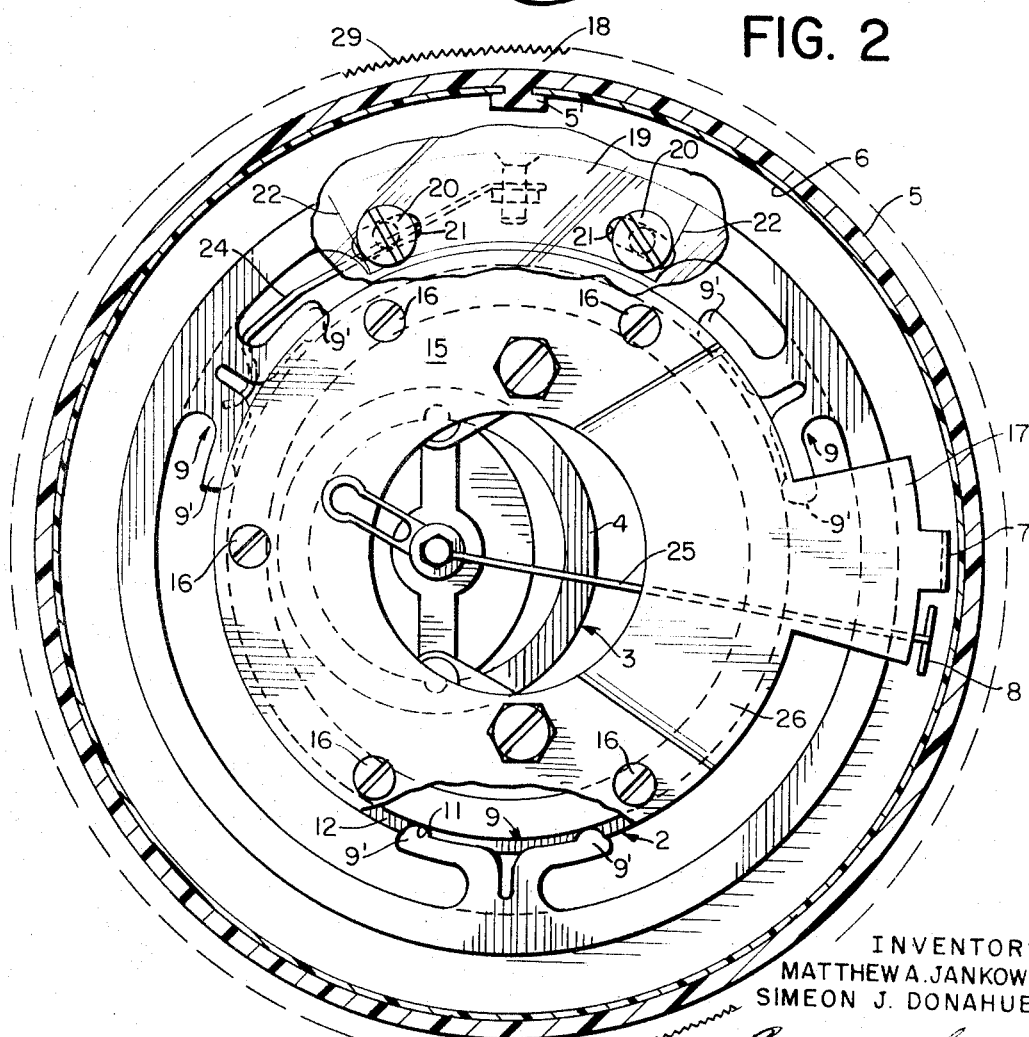
FIG. 2 is a plan view of the assembly shown in FIG. 1.

As shown in FIG. 2, this meter movement unit 4 is secured to the plate member of the set-point unit; and upon attachment of the plate member to the hub, is disposed compactly within the hub. The meter movement unit includes an arm 25 which extends over the front axial end of both the hub and drum and under the arm 17 of the set-point unit. The meter indicating pointer 8 is attached to the outer end of the arm 25 in overlying relation with the scale 6. To allow the arm 25 to move relative to the set-point unit as it measures the actual values of the process variable, a raised segment 26 is provided in the plate member where it overlies the arm 25.

In operation of the set-point assembly, the positioning of the contacts along the slide wires determines the electrical signal that is sent to the controller unit. To transfer this signal, the slide wires are connected electrically into the controller unit; and in accordance with the teachings of the present invention, this is accomplished by providing the slide wires with terminal connectors 27 extending axially from the back end of the hub. In positioning the set-point assembly into the controller system, it is therefore simply a matter of mounting the assembly to a suitable support and connecting the terminals 27.

The mounting of the set-point assembly is easily attained by securing the back flange 14 of the hub to a support by screws or other suitable means threaded into holes 28 in the flange. The electrical connection of the contact terminals 27 may be made by sliding them into appropriate receiving connectors or by soldering them to terminal leads provided in the controller for this purpose. With the assembly mounted in this way, the set point may be chosen by rotating the drum. Advantageously, the flange 18 of the drum is provided with a toothed periphery 18 to provide for good manual grip of the drum. Alternatively, the drum may be gear driven through this toothed periphery.

We claim:

1. A set-point assembly for generating a reference signal indicative of a set value of a process variable comprising:
   a. a housing drum;
   b. a scale disposed along the outer circumference of said drum;
   c. an inner hub concentrically mounted within said drum and spaced radially inward therefrom for relative coaxial rotation with respect thereto;
   d. a meter movement unit for measuring the actual value of said process variable disposed within said hub and having an indicating pointer disposed over said scale for movement there along in response to changes in the actual value of said process variable; and
   e. set-point means including a set pointer mounted on the hub for rotation therewith and extending in a radial direction over said scale for movement there along to a fixed position corresponding to said set value of the process variable upon rotation of said drum relative to said hub, contact means fixed to the interior of said drum, and slide wire means secured to the outer surface of said hub in opposed alignment with said contact means for engagement therewith upon rotation of said drum relative to said hub, said slide wire extending circumferentially around said hub in a path disposed at varying locations axially of said hub.

2. A set-pointer assembly according to claim 1 wherein:
   a. said drum includes at least three inwardly extending drum bearing means for supporting said hub for rotation, relative thereto, said drum bearing means normally describing a circle of smaller diameter than that of said hub and being flexibly movable outwardly to receive said hub in rotational engagement.

3. A set-point assembly according to claim 2 wherein:
   a. said drum is a one-piece molded plastic structure; and
   b. each of the drum bearing means includes a pair of arms extending radially inwardly of the drum and then circumferentially in opposite directions.

4. A set-point assembly according to claim 2 wherein:
   a. said drum bearing means are located at one axial end of said drum;
   b. said hub includes a bearing surface of reduced diameter at one axial end thereof for rotatably engaging said drum bearing means, said reduced bearing surface defining a hub flange facing said one axial end and aligned with one side of said drum bearing means for precluding axial movement of said hub in one direction; and
   c. said set point means includes a plate member fixed to the one axial end of said hub and aligned with the other side of said drum bearing means to lock said hub in said drum against axial movement.

5. A set-point assembly according to claim 4 wherein:
   a. said drum and hub are each a one-piece molded plastic structure.

6. A set-point assembly according to claim 5 wherein:
   a. said hub includes outwardly extending hub bearing means for engaging the inner surface of said drum, said hub bearing means being axially spaced from the drum bearing means.

7. A set-point assembly according to claim 1 wherein:
   dially over one axial end of said hub and drum;
   b. said set pointer is attached to the outer end of said arm; and
   c. said drum includes a raised stop means at one axial end thereof in rotational alignment with said arm.

8. A set-point assembly according to claim 1 wherein:
   a. said set-point means includes an arm extending radially over one axial end of said hub and drum;
   b. said set pointer is attached to the outer end of said arm;
   c. said drum includes a radially extending flange at the other axial end thereof; and
   d. said assembly further includes a cover seated on said flange and covering the one axial end of both said hub and drum and the set-point means.

9. A set-point assembly according to claim 8 wherein:
   a. the cover is fixed to said drum for rotation therewith.

10. A set-point assembly according to claim 9 wherein:
    a. said drum flange includes a toothed periphery for gear driving thereof.

11. A set-point assembly according to claim 9 wherein:
    a. said cover has a transparent portion overlying said scale.

12. A set-point assembly according to claim 11 further including:
    a. a transparent strip of material removably disposed along the inner surface of the transparent portion of said cover, said strip having the scale thereon.

13. A set-point assembly according to claim 1 wherein:
    a. said set-point means includes a plate member fixed across one axial end of said hub;
    b. the meter movement unit is supported by the plate member;

c. the meter movement unit includes an indicating pointer extending radially over the one axial end of said hub and drum and into overlying relation with said scale; and d. said set-point means includes an arm extending radially over the one axial end of said hub and drum with said set pointer attached thereto in overlying relation with said scale.

14. A set-point assembly according to claim 1 wherein:

a. said slide wire means extends spirally around said hub for one revolution.

15. A set-point assembly according to claim 14 further including:

a. terminal connector means connected to the slide wire means and extending axially from the other end of the hub.

16. A set-point assembly comprising:
a. a housing drum;
b. an inner hub rotatably mounted in spaced relation within the drum;
c. contact means fixed to the interior of said drum; and
d. slide wire means secured to the outer surface of said hub with a surface in opposed alignment with said contact means for engagement therewith upon rotation of said drum relative to said hub, the surface of said slide wire means engaging the contact means having an axial width less than the axial width of the contact means and extending circumferentially around said hub in a path varying axially of said hub for engagement with said contact means at different axial locations during said rotation.

17. A set-point assembly comprising:
a. a housing drum;
b. a scale disposed along the outer circumference of said drum;
c. an inner hub rotatably mounted within said drum and having a hub bearing surface of reduced diameter at one end thereof, said reduced diameter defining a hub flange facing said one axial end;
d. a meter movement unit disposed within said hub;
e. drum bering means located at one axial end of said drum and extending inwardly thereof for rotatably supporting the hub, said drum bearing means normally describing a circle of smaller diameter than that of said hub bearing surface and being flexibly movable outwardly to engage said hub bearing surface with one side thereof axially aligned with said hub flange for precluding axial movement of said hub in one direction; and f. set-point means mounted on said hub for rotation therewith and including:
1. a plate member fixed to the one axial end of said hub and axially aligned with the other side of said drum bearing means to lock said hub in said drum against axial movement,
2. an arm extending radially over the one axial end of said hub and drum, and
3. a set pointer attached to the outer end of said arm and disposed over said scale for movement therealong upon rotation of said drum relative to said hub.

18. A set-point assembly according to claim 17 wherein:

a. said drum includes a radial flange at the other axial end thereof; and
b. said assembly further includes a cover seated on said flange for rotation with said drum and covering the one axial end of both said hub and drum and the set point means, said cover having a transparent portion overlying said scale.

19. A set-point assembly according to claim 18 further including:

a. a transparent strip of material removably disposed along the inner surface of the transparent portion of said cover, said strip having the scale thereon.

20. A set-point assembly comprising:
a. a housing drum;
b. an inner hub rotatably mounted in spaced relation within said drum;
c. contact means fixed to the interior of said drum;
d. slide wire means secured to the outer surface of said hub in opposed alignment with said contact means for engagement therewith upon rotation of said drum relative to said hub, said slide wire means extending spirally around said hub for one revolution; and
e. said drum and hub have cooperating means for limiting relative rotation thereof in either direction to less than 360°.

* * * * *

UNITED STATES PATENT OFFICE
CERTIFICATE OF CORRECTION

Patent No. 3,784,949   Dated January 8, 1974

Inventor(s) Matthew A. Jankowski and Simeon J. Donahue

It is certified that error appears in the above-identified patent and that said Letters Patent are hereby corrected as shown below:

Column 1, line 23, "input referene signal" should read --input reference signal--.

Column 3, line 19, "Tis plate member" should read --This plate member".

Column 4, line 20, "surface of the hub" should read --surface of the drum--.

Column 5, line 25, "toothed periphery 18" should read --toothed periphery 29--.

Column 6, line 30, "dially over one axial" should read --(a) said set point means includes an arm extending radially over one axial--.

Signed and sealed this 17th day of September 1974.

(SEAL)
Attest:

McCOY M. GIBSON, JR.
Attesting Officer

C. MARSHALL DANN
Commissioner of Patents